United States Patent
Nakazawa et al.

(10) Patent No.: US 7,914,355 B2
(45) Date of Patent: Mar. 29, 2011

(54) METHOD OF MANUFACTURING DISPLAY APPARATUS WITH SAW TOUCH SENSOR

(75) Inventors: Fumihiko Nakazawa, Kawasaki (JP); Takashi Katsuki, Kawasaki (JP); Yuji Takahashi, Kawasaki (JP); Satoshi Sato, Kawasaki (JP); Satoshi Sasaki, Yonezawa (JP); Tamotsu Watanabe, Yonezawa (JP); Kunizo Ogoshi, Yonezawa (JP); Michiko Endo, Tokyo (JP)

(73) Assignees: Tohoku Pioneer Corporation, Tendo (JP); Fujitsu Limited, Kawasaki (JP); Fujitsu Component Limited, Tokyo (JP)

( * ) Notice: Subject to any disclaimer, the term of this patent is extended or adjusted under 35 U.S.C. 154(b) by 140 days.

(21) Appl. No.: 12/278,697

(22) PCT Filed: Feb. 8, 2006

(86) PCT No.: PCT/JP2006/302148
§ 371 (c)(1),
(2), (4) Date: Dec. 16, 2008

(87) PCT Pub. No.: WO2007/091311
PCT Pub. Date: Aug. 16, 2007

(65) Prior Publication Data
US 2009/0156083 A1    Jun. 18, 2009

(51) Int. Cl.
*H01J 9/24* (2006.01)
(52) U.S. Cl. ........................................ 445/24
(58) Field of Classification Search ............... 445/24–25
See application file for complete search history.

(56) References Cited

U.S. PATENT DOCUMENTS

| | | | |
|---|---|---|---|
| 6,814,642 B2 | 11/2004 | Siwinski et al. | |
| 6,880,786 B2 * | 4/2005 | Weis et al. | 244/149 |
| 2002/0167270 A1 | 11/2002 | Siwinski et al. | |
| 2002/0171610 A1 | 11/2002 | Siwinski et al. | |
| 2004/0239647 A1 | 12/2004 | Endo | |

FOREIGN PATENT DOCUMENTS

| | | |
|---|---|---|
| JP | 2002-156920 A | 5/2002 |
| JP | 2002-366303 A | 12/2002 |
| JP | 2003-36144 A | 2/2003 |
| JP | 2004-348686 A | 12/2004 |
| JP | 2006-48453 A | 2/2006 |

OTHER PUBLICATIONS

International Search Report of PCT/JP2006/302148, date of mailing Mar. 7, 2006.

* cited by examiner

*Primary Examiner* — Toan Ton
*Assistant Examiner* — Hana S Featherly
(74) *Attorney, Agent, or Firm* — Westerman, Hattori, Daniels & Adrian, LLP

(57) ABSTRACT

First electrodes partially configuring light-emitting elements are patterned in the form of stripes on a first major surface of a transparent substrate. Next, piezoelectric elements functioning a SAW touch sensor are formed on a second major surface of the transparent substrate. Next, the light-emitting elements forming step of forming light-emitting elements on the first electrodes which are patterned in advance is sequentially executed. After the formation of the piezoelectric elements, since the step of forming the light-emitting elements is executed, the light-emitting elements can be prevented from being damaged by receiving heat in the formation of the piezoelectric elements.

2 Claims, 16 Drawing Sheets

[Fig. 1]
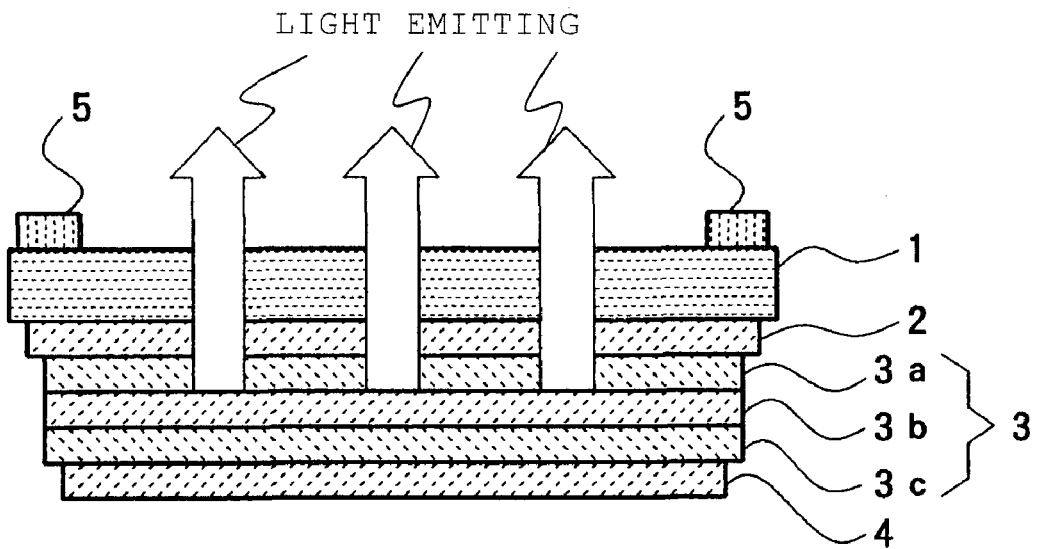
[Fig. 2]
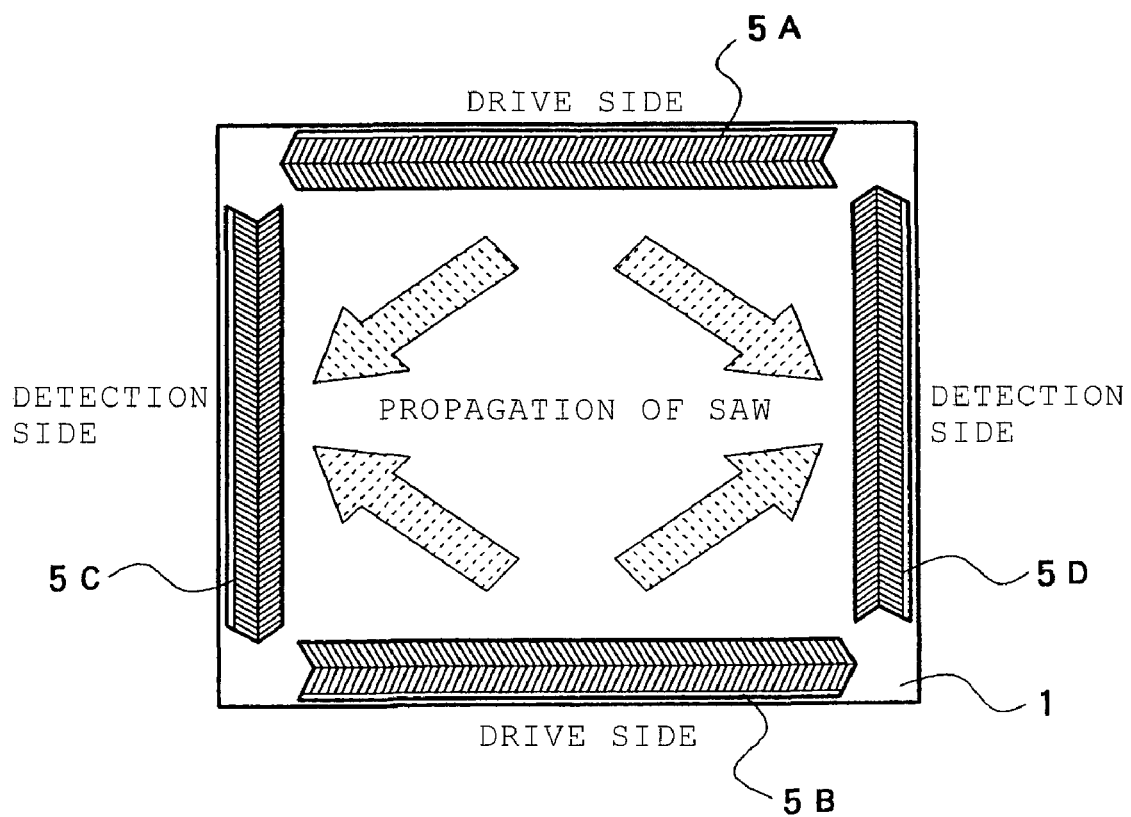

[Fig. 3]
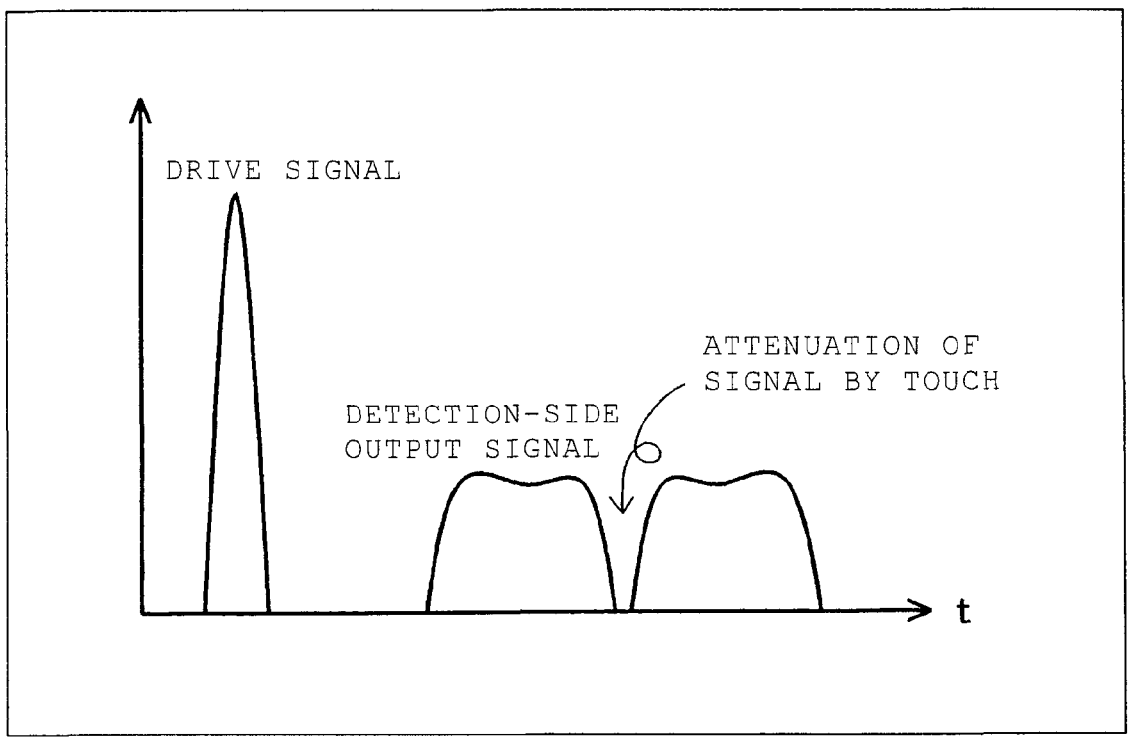

[Fig. 4]
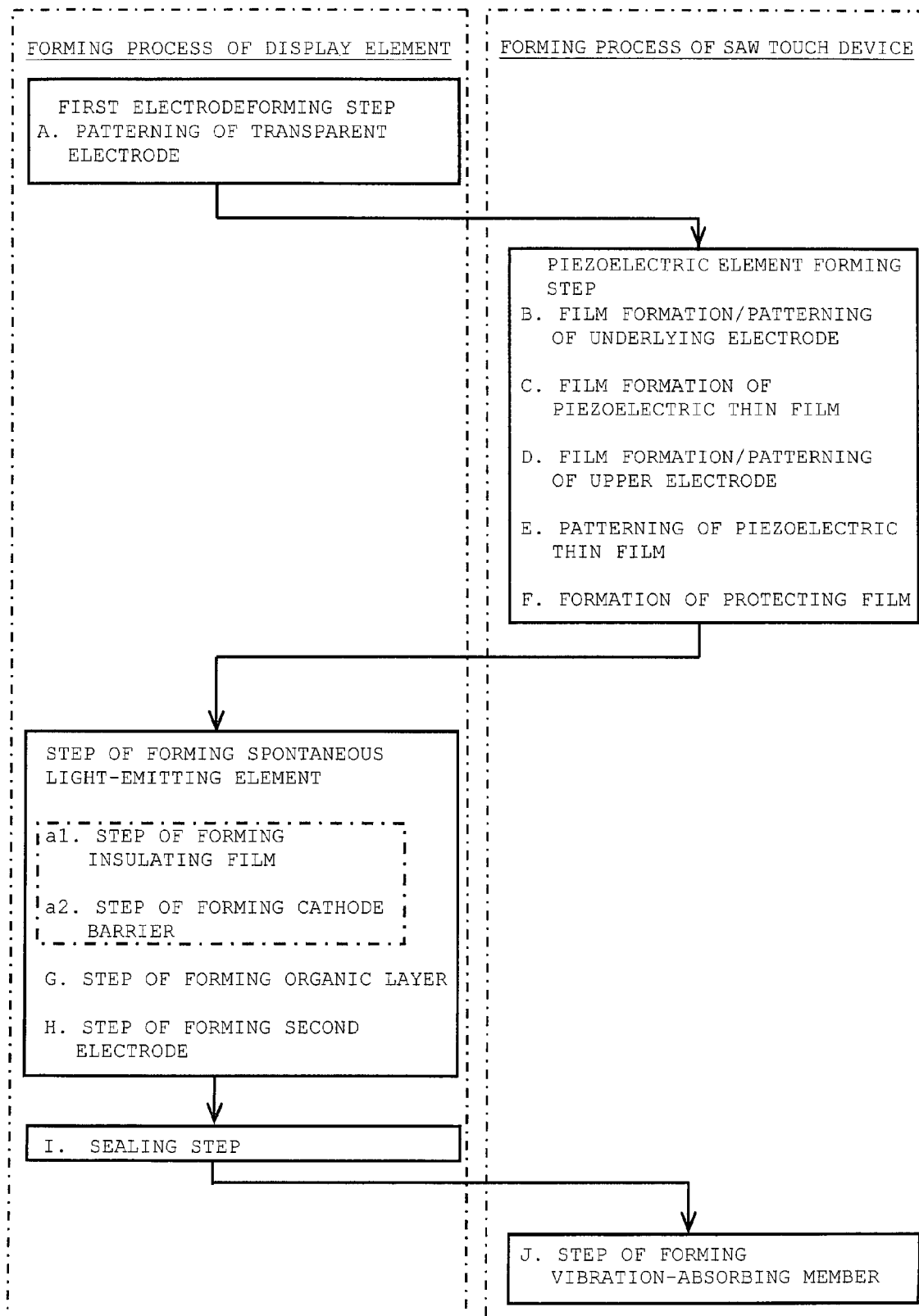

[Fig. 5A]
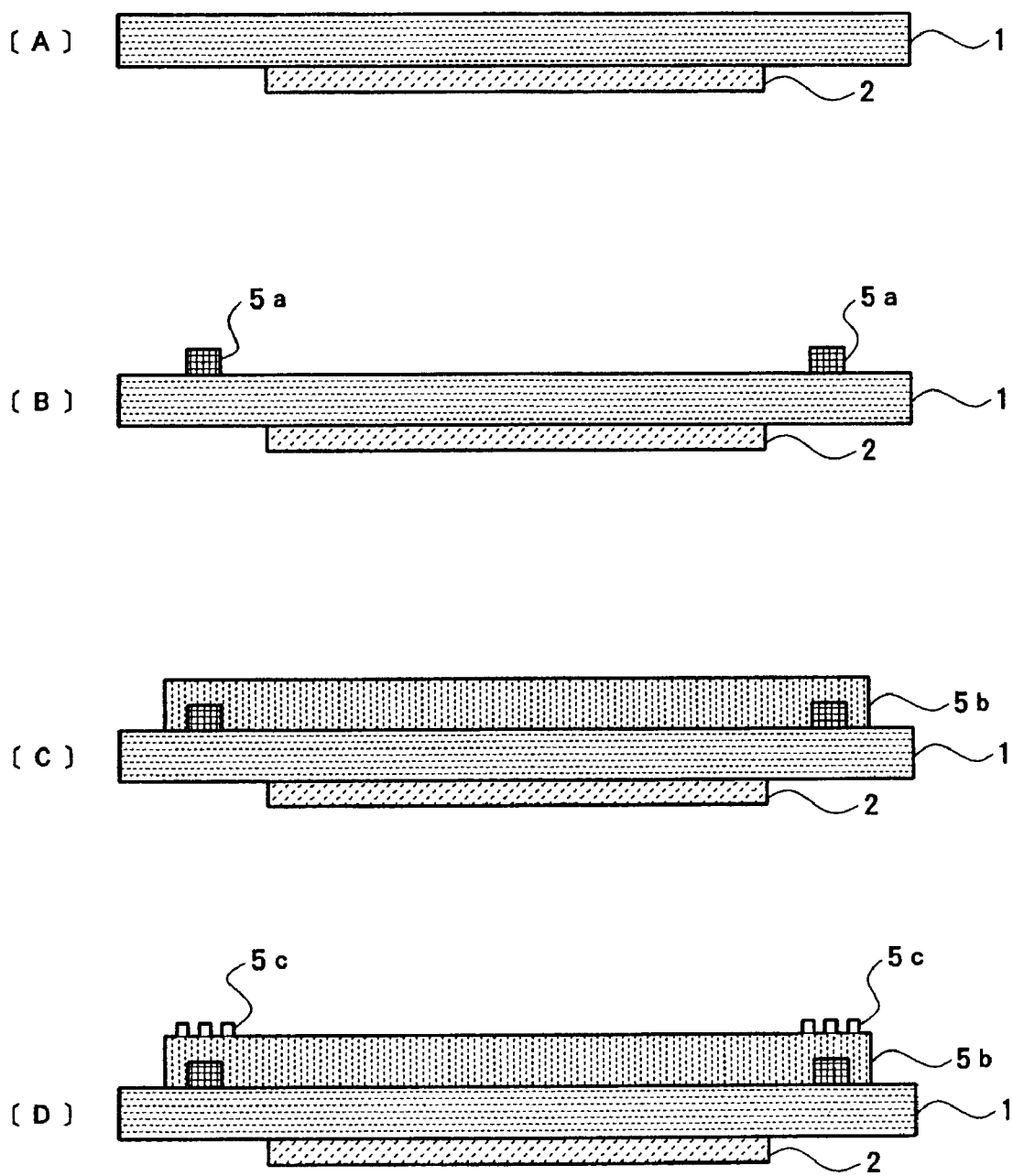

[Fig. 5B]
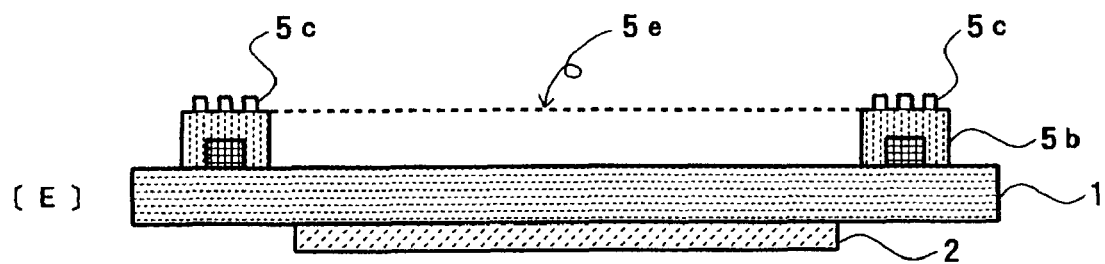
[E]
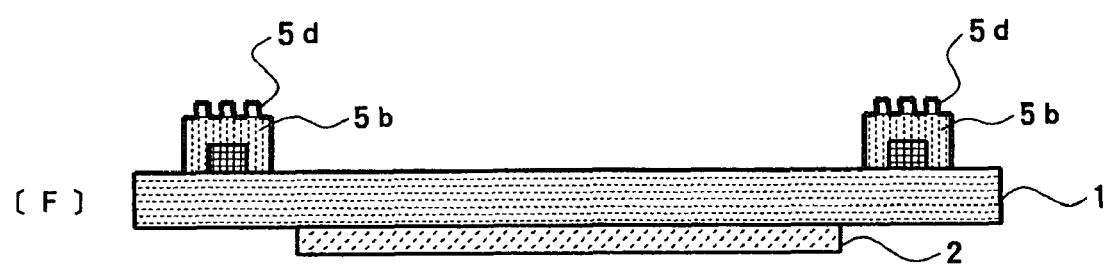
[F]
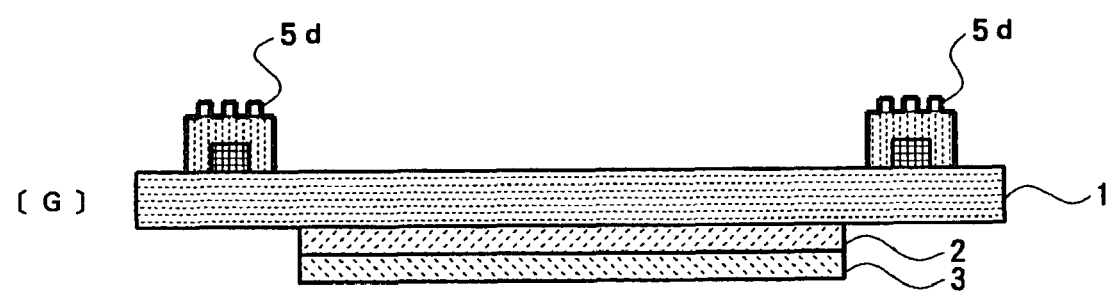
[G]
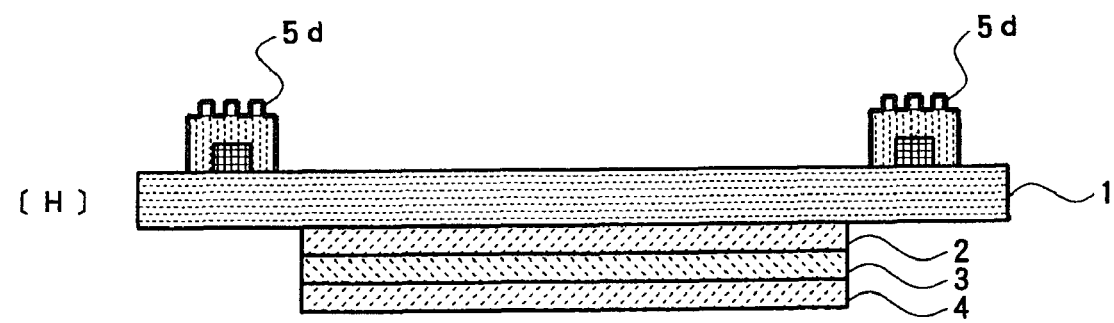
[H]

[Fig. 5C]
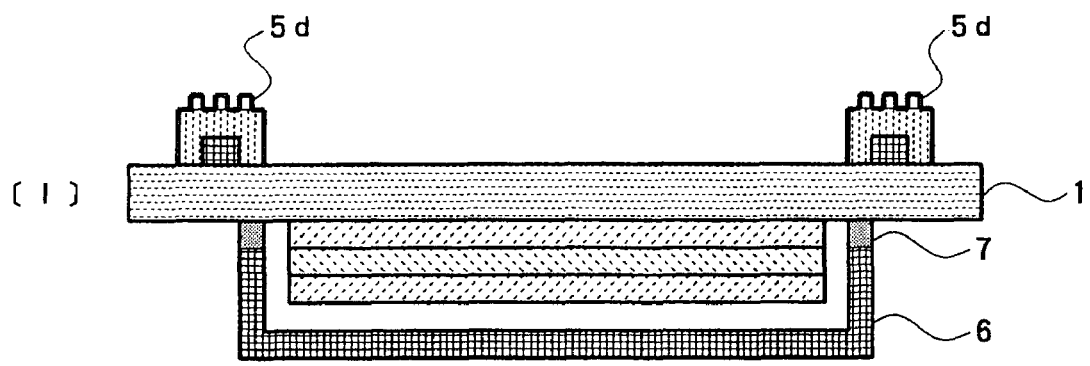
[ I ]
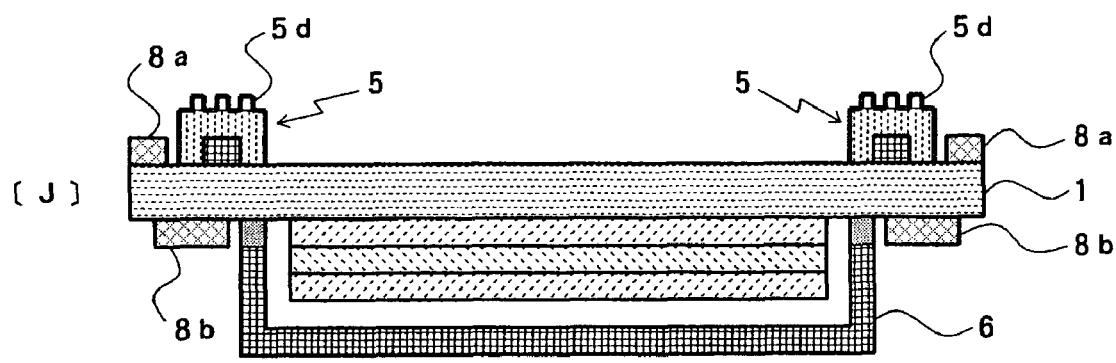
[ J ]

[Fig. 6]
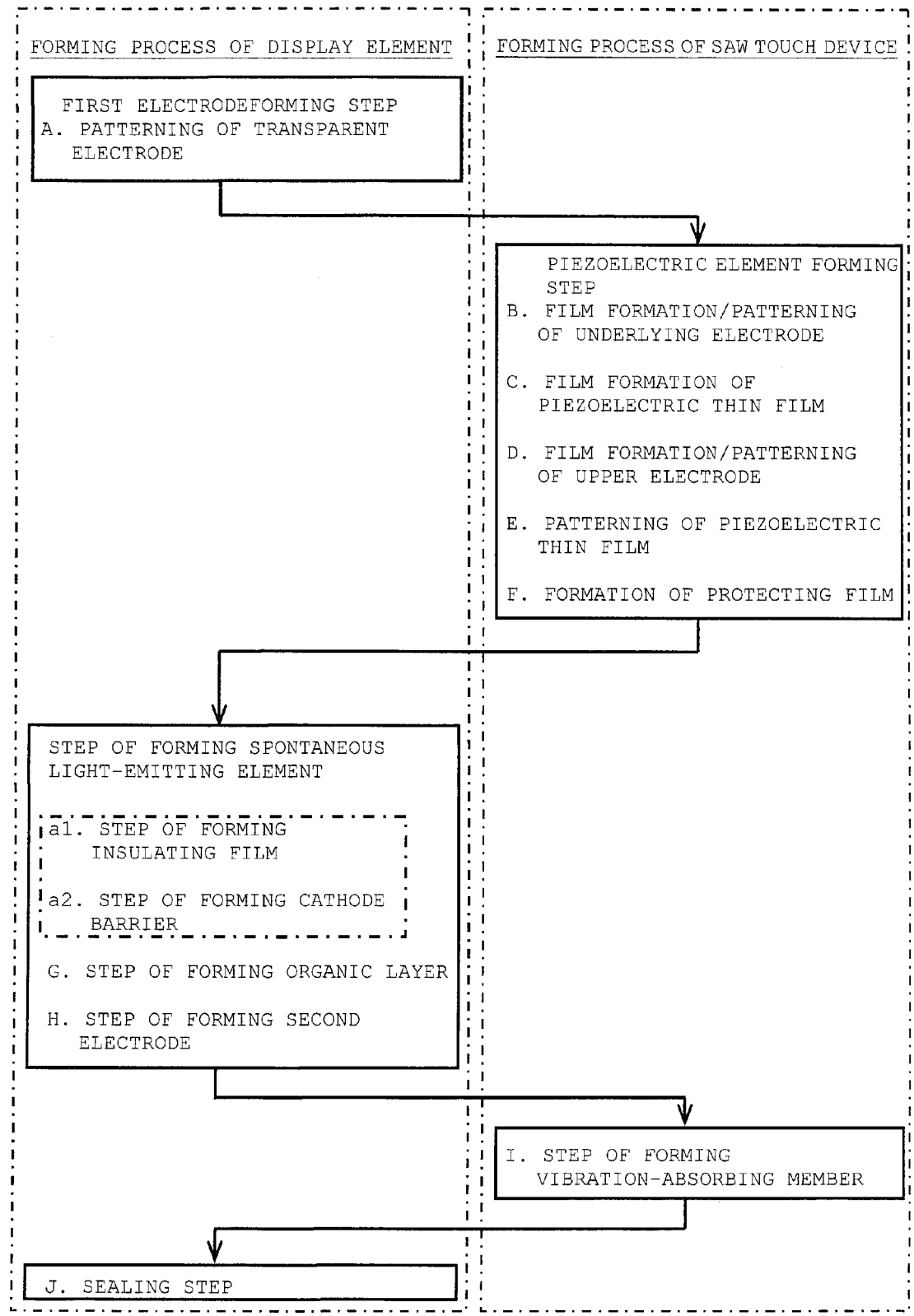

[Fig. 7]
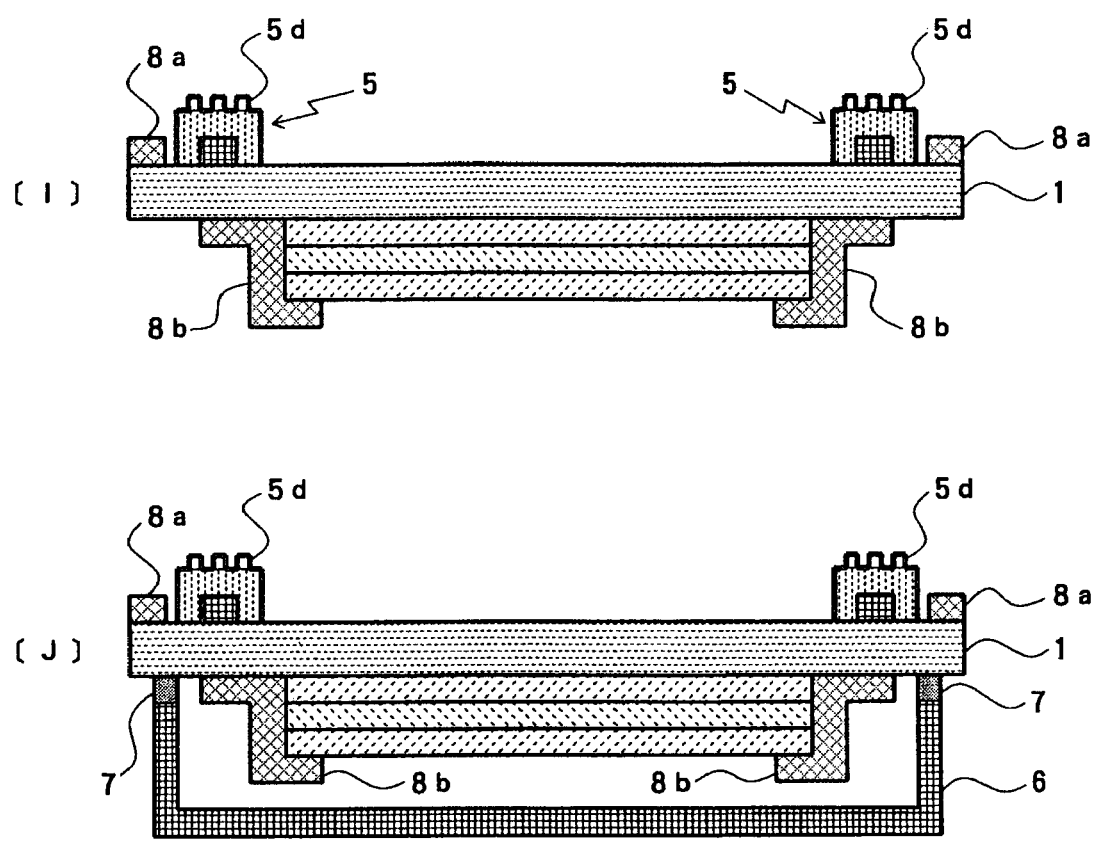

[Fig. 8A]
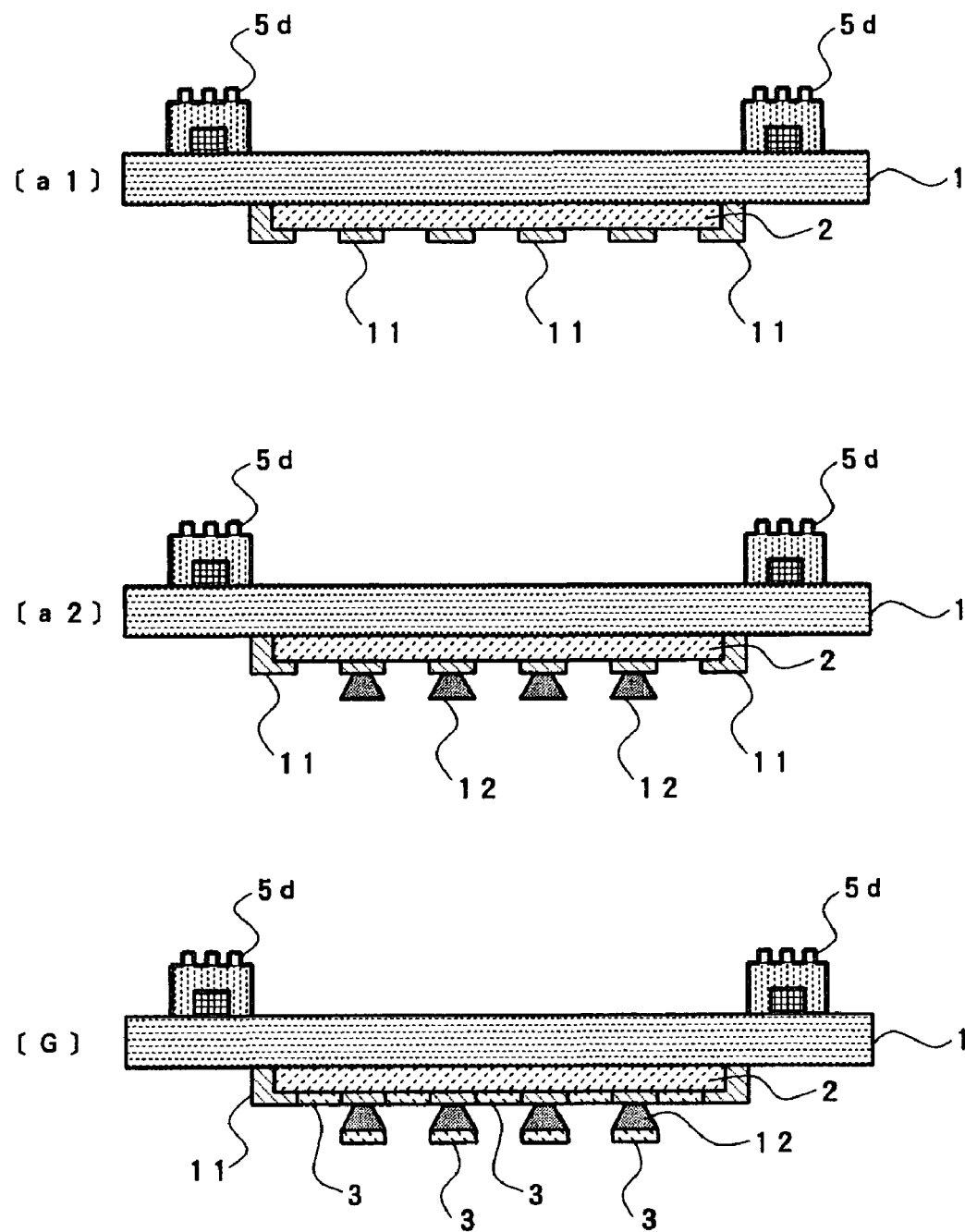

[Fig. 8B]
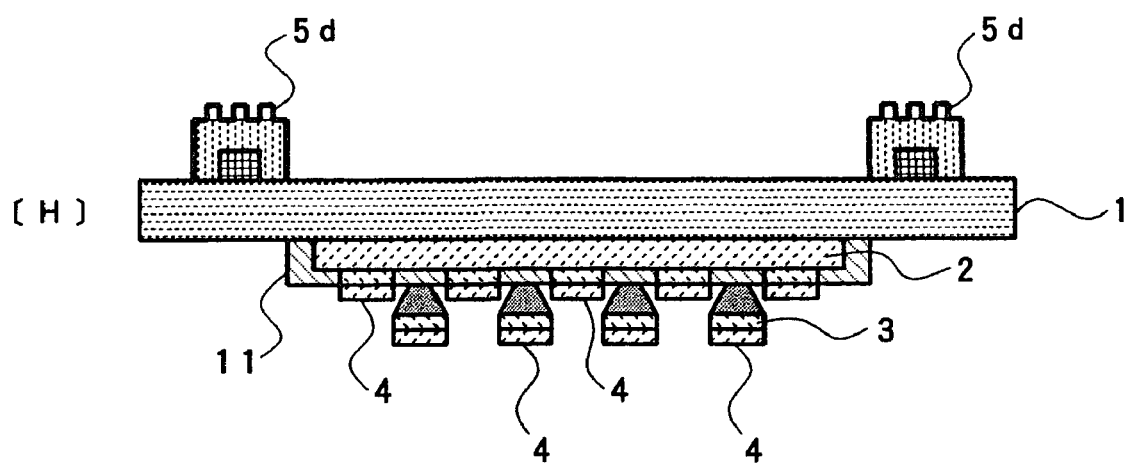

[Fig. 9]
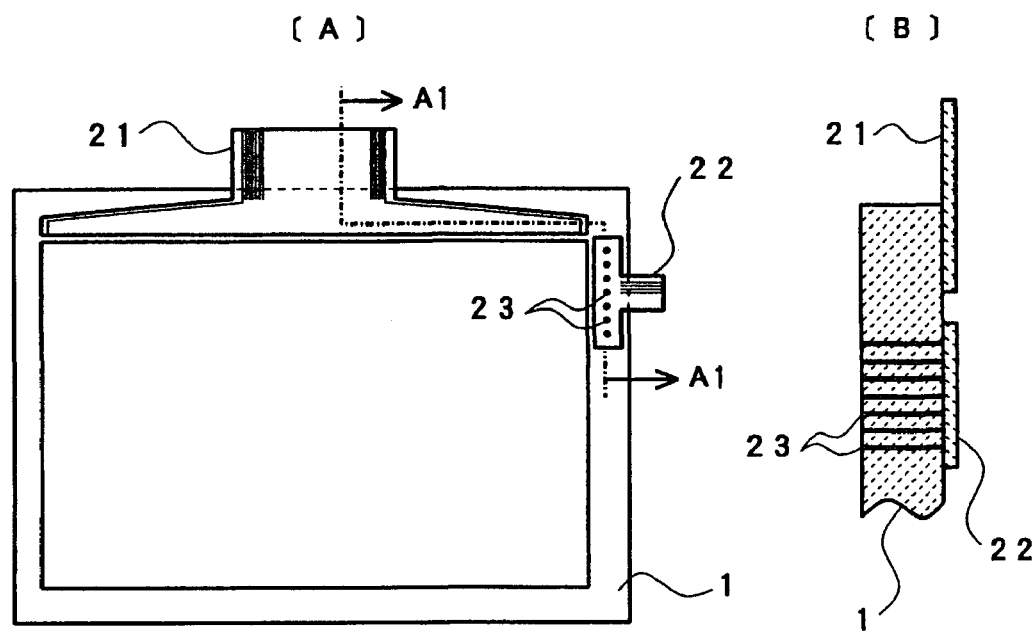
[Fig. 10]
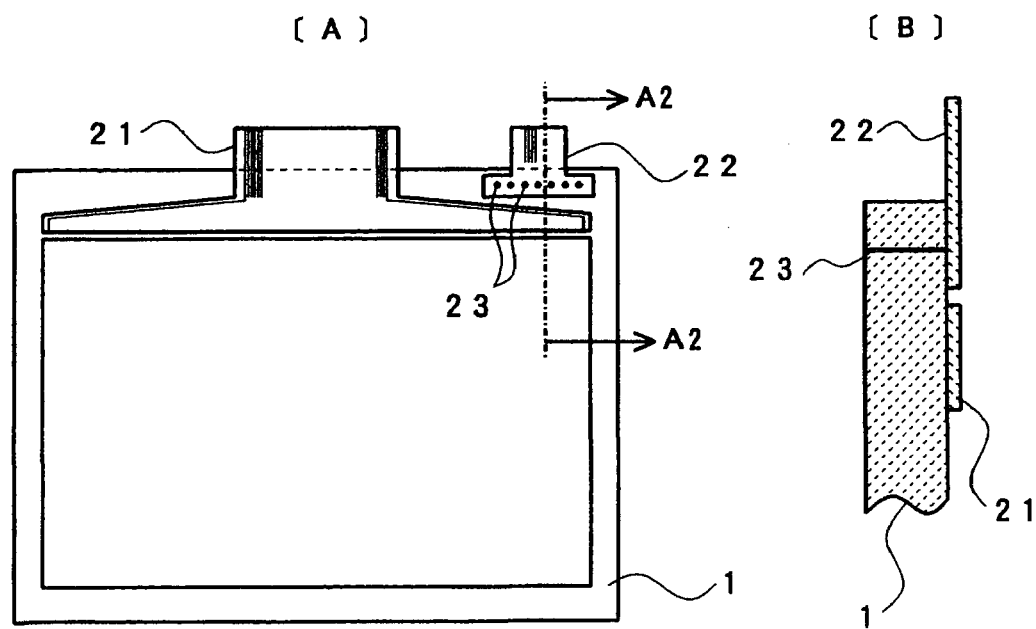

[Fig. 11]
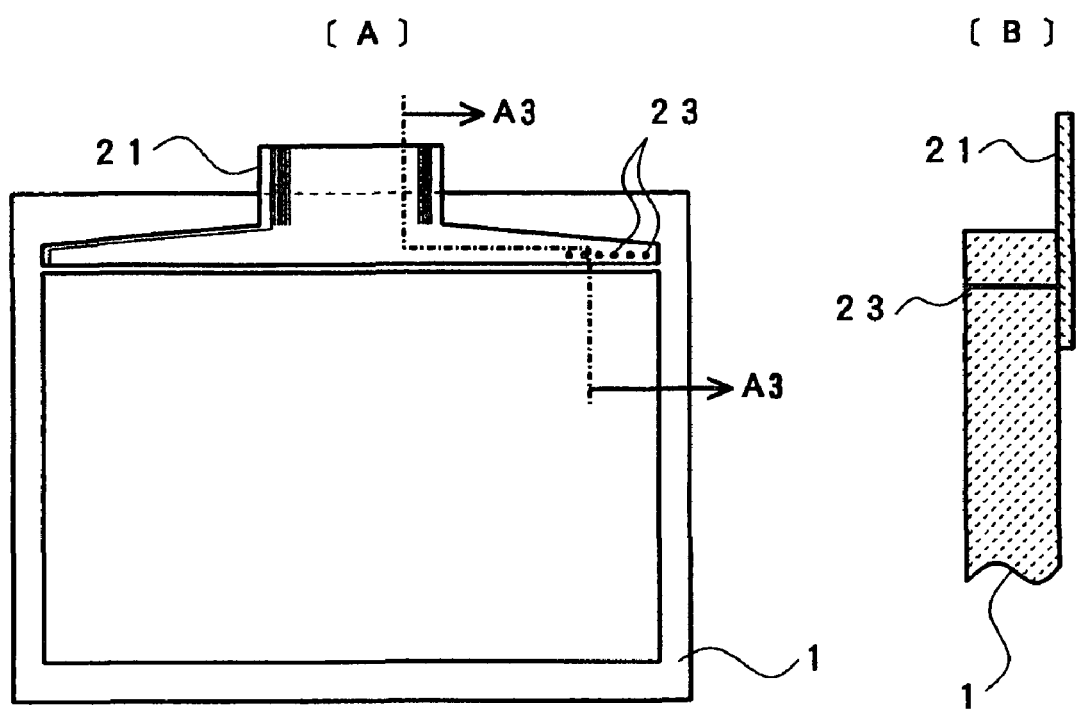

[Fig. 12]
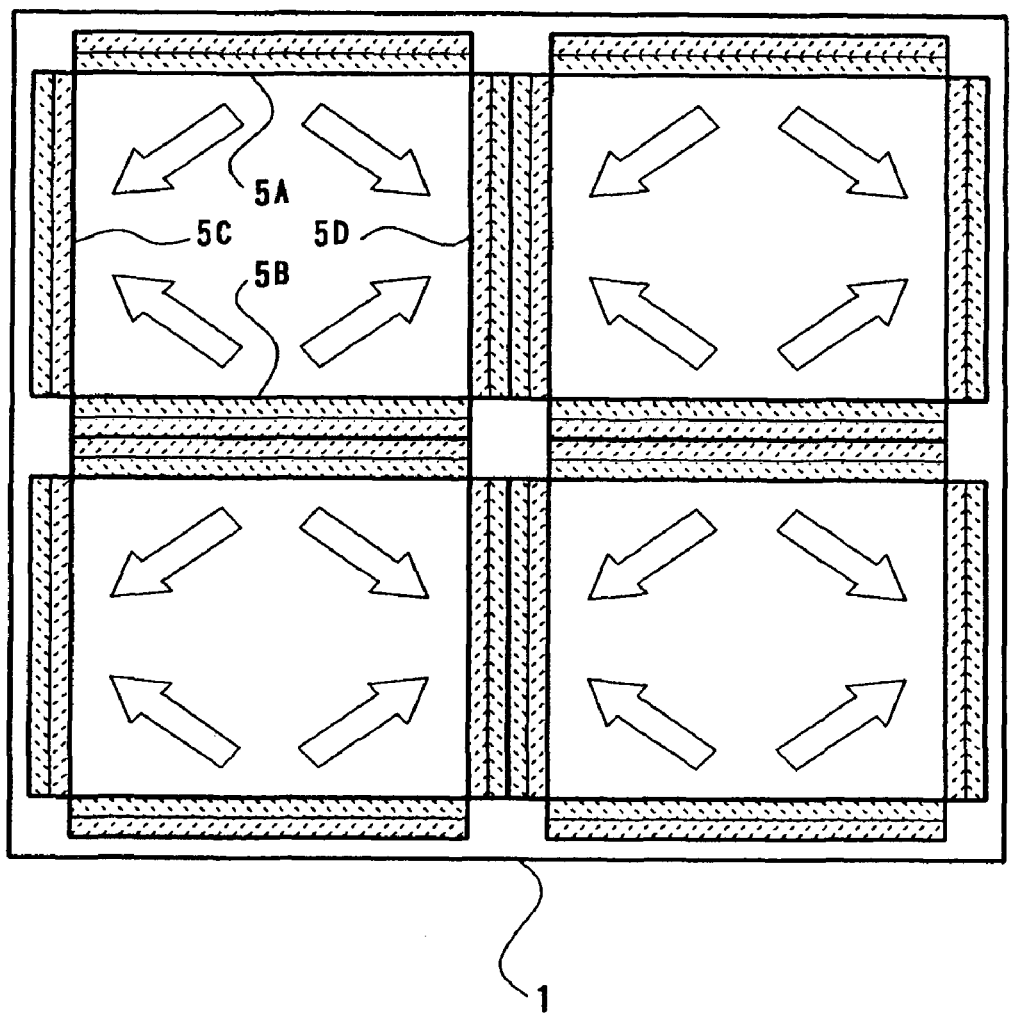

[Fig. 13]
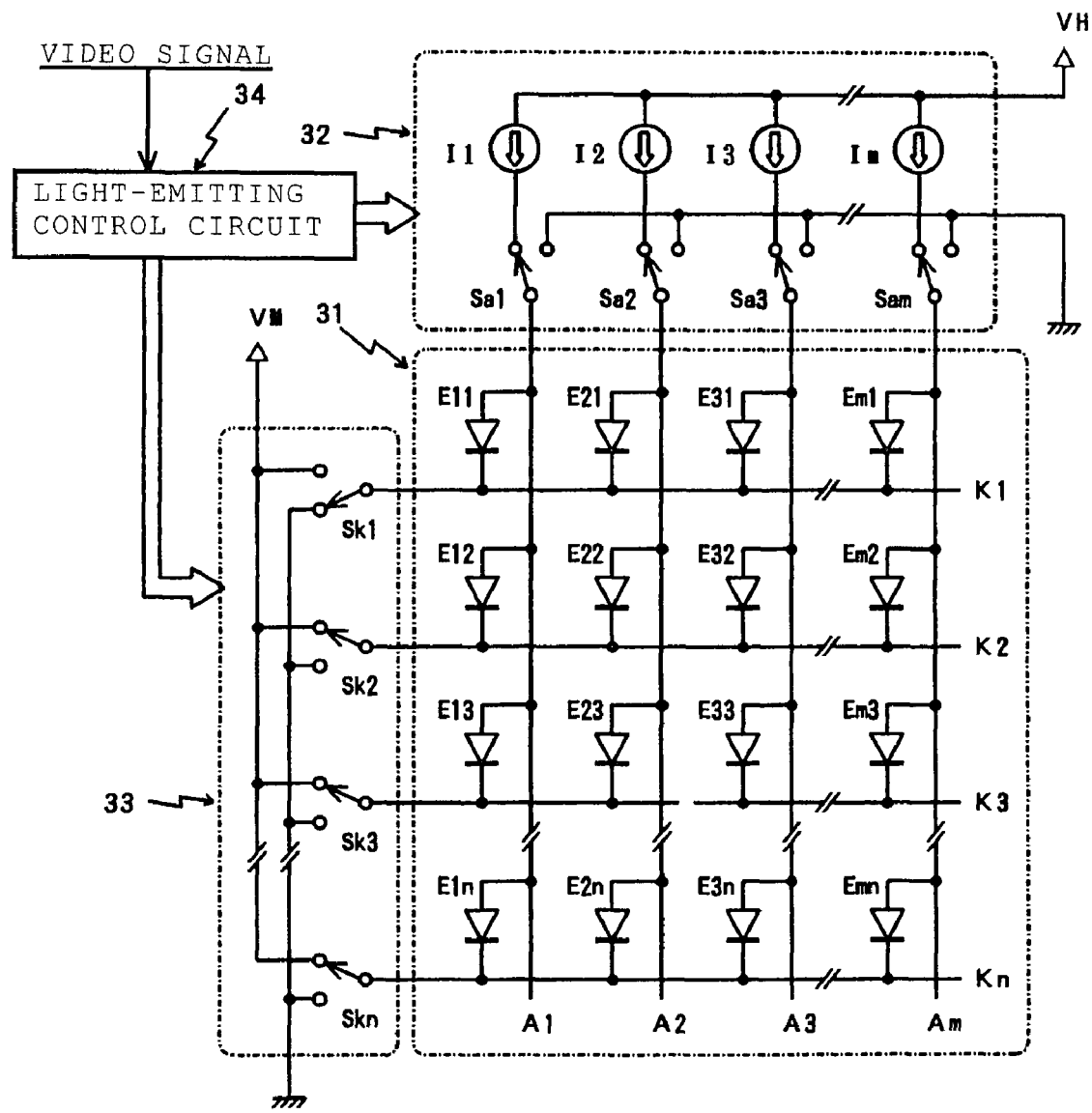

[Fig. 14]
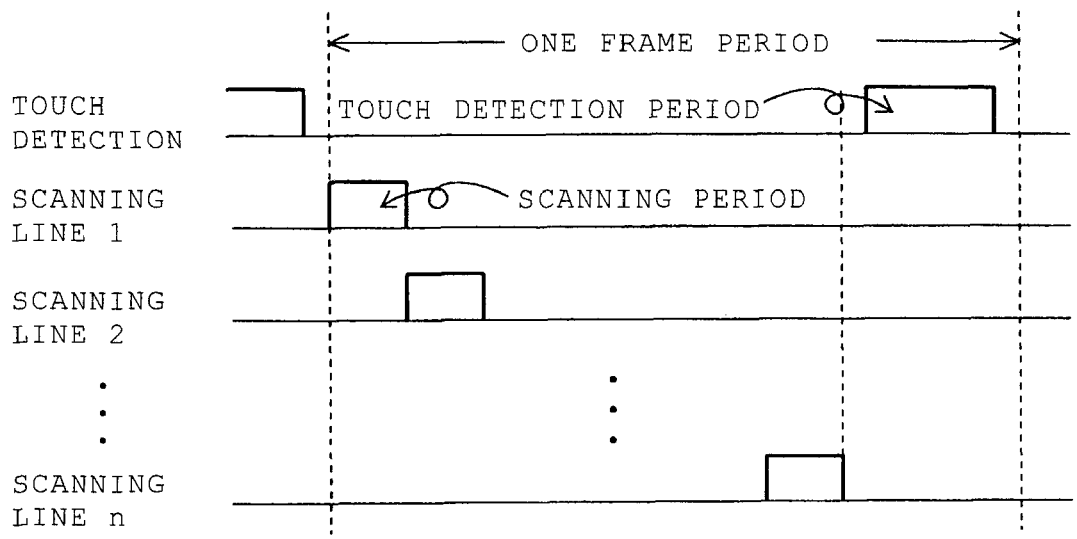
[Fig. 15]
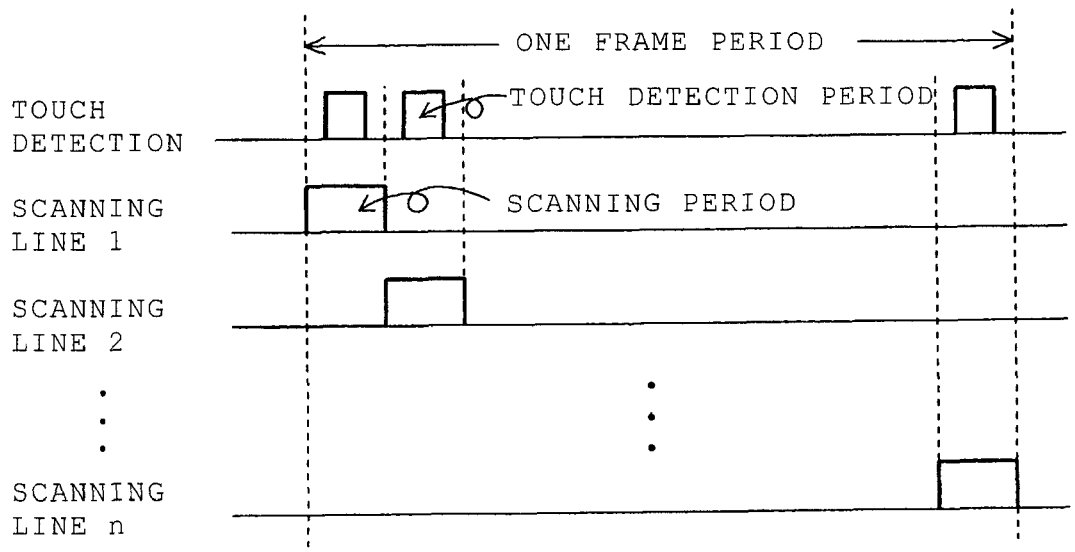

[Fig. 16]
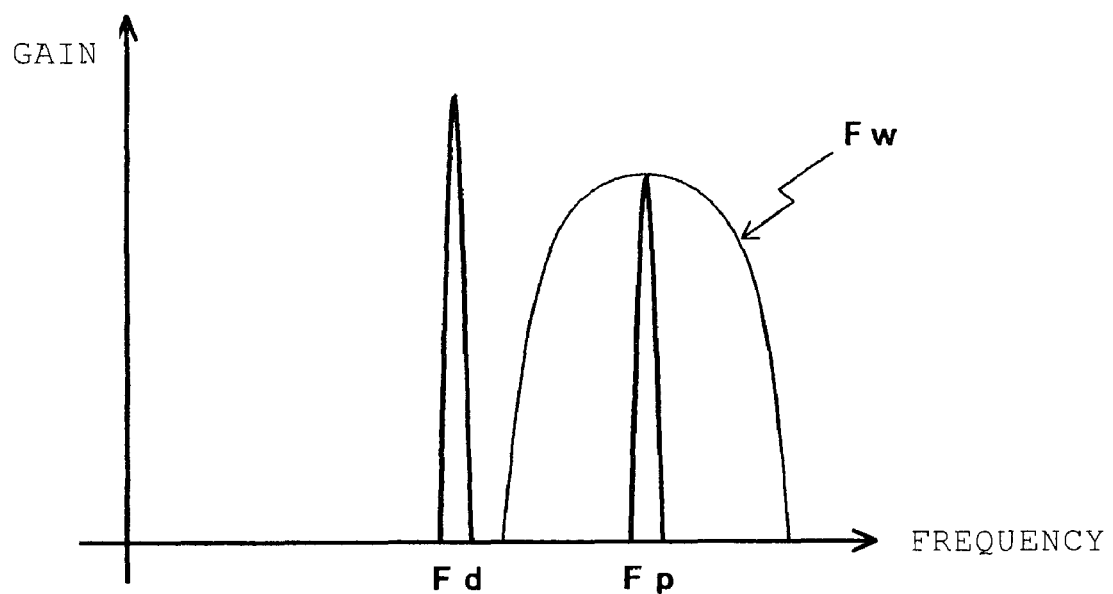

METHOD OF MANUFACTURING DISPLAY APPARATUS WITH SAW TOUCH SENSOR

TECHNICAL FIELD

The present invention relates to a method of manufacturing a display apparatus with SAW touch sensor in which light-emitting elements and piezoelectric elements functioning as an SAW (surface acoustic wave) touch sensor are formed on one surface of a transparent substrate and the other surface of the transparent substrate, respectively.

BACKGROUND ART

With popularization of a mobile telephone, a personal digital assistance (PDA), and the like, display panels each of which has a high-definition image display function and can realize a small thickness and a low power consumption are increasingly demanded. Conventional liquid crystal display panels have been employed in various products including the products described above as display panels which fulfil the demand.

On the other hand, in recent years, a display panel using an organic EL (electroluminescence) elements which take advantage of being light-emitting elements as light-emitting pixels is realized. The display panel attracts attention as a next-generation display panel replaced with a conventional liquid crystal display panel. By using an organic compound which can expect a preferable light-emitting characteristic on a light-emitting layer of the element, practical high efficiency and long life are advanced in the background.

In addition to the display panel, a personal digital assistance having a touch sensing function which, in response to display information displayed on the display panel, touches a display screen of the display information by using a fingertip, a touch pen, or the like to make it possible to input various commands is also proposed. This can be preferably employed in the PDA or the like.

The conventional display apparatus including the touch sensing function realizes its integration such that a touch panel having a touch sensing function and an EL display panel are manufactured as independent parts, and the touch panel is stuck to a surface of the display panel. This is described in Patent Document 1.

Patent Document 1: Japanese Patent Application Laid-Open No. 2002-156920

As described in the Patent Document 1, the display panel and the touch panel are integrated with each other by being stuck to each other to cause a problem of an increase in entire panel thickness. The display apparatus cannot meet the demands of thinning and miniaturization made by the personal digital assistance which is very strongly demanded to be thinned and miniaturized.

When a film-like resistive film touch panel is used as described in the Patent Document 1, a transmittance of light from the display panel decreases because a transparent electrode (ITO film) is formed on the panel surface, and the touch panel surface is colored by the transparent electrode to disadvantageously cause a color shift (deviation) on a display image.

In order to solve the above problems, an SAW touch sensing function which does not need to form a transparent electrode for a touch sensing function as described on the Patent Document 1 on a panel surface is employed, and without using a configuration in which a touch panel is stuck to a display panel as described above, the SAW touch sensing function is formed on the other surface of the transparent substrate on which an organic EL element is formed is proposed. The configuration is disclosed in the following Patent Document 2, Patent Document 3, and the like.

Patent Document 2: Japanese Patent Application Laid-Open No. 2002-366303

Patent Document 3: Japanese Patent Application Laid-Open No. 2003-036144

DISCLOSURE OF THE INVENTION

Problem to be Solved by the Invention

In formation of a touch panel integrated display apparatus described in the Patent Document 2 and the Patent Document 3, after piezoelectric elements functioning a touch sensor are formed on one surface of a shared transparent substrate in advance, when light-emitting elements typified by organic EL elements are to be formed on the other surface of the transparent substrate, the piezoelectric elements which are previously formed are disadvantageously damaged by an etching solution used in a patterning step performed to, for example, the transparent electrode in formation of the light-emitting elements.

In order to avoid the problem, after the light-emitting elements typified by the organic EL elements are formed on one surface of the shared transparent substrate in advance, when the piezoelectric elements are to be formed on the other surface of the transparent substrate, the light-emitting elements made of an organic material cannot withstand a temperature in the formation of the piezoelectric elements and is disadvantageously damaged.

The present invention has its object to provide a method of manufacturing a display apparatus which shares a transparent substrate as described above and forms light-emitting elements and an SAW touch sensing function are formed on one surface of the transparent substrate and the other surface, respectively, to solve a problem in that the element formed on any one of the surfaces is damaged by the etching solution and the temperature.

Means for Solving Problem

The manufacturing method according to the invention made to solve the above problem is a method of manufacturing a display apparatus with SAW touch sensor in which light-emitting elements are formed on a first major surface of a single transparent substrate and piezoelectric elements functioning as an SAW touch sensor is formed on a second major surface of the transparent substrate, wherein the first electrode forming step of forming a first electrode pattern on the first major surface of the transparent substrate; the piezoelectric elements forming step of forming the piezoelectric elements on the second major surface after the first electrode forming step; and the light-emitting elements forming step of forming the light-emitting elements on the first major surface on which the first electrode is patterned after the piezoelectric elements forming step are sequentially executed.

The manufacturing method according the invention sequentially executes, in the light-emitting elements forming step, the organic layer forming step of forming an organic layer on the first major surface on which the first electrode is patterned, and the second electrode forming step of forming a second electrode pattern on the organic layer after the organic layer forming step.

Effect of the Invention

According to the method of manufacturing a display apparatus with the SAW touch sensor, the step of patterning the first electrode functioning one electrode of the light-emitting elements on the first major surface of the transparent substrate and then forming the piezoelectric elements having the SAW touch sensing function on the second major surface of the transparent substrate is executed. Therefore, in the patterning of the first electrode functioning as one electrode of the light-emitting elements in advance, although the etching solution is used, the piezoelectric elements are formed thereafter. For this reason, the piezoelectric elements are not influenced by the etching solution.

After the piezoelectric elements are formed on the second major surface of the transparent substrate, the step of forming the light-emitting elements on the first major surface on which the first electrode is patterned is executed. For this reason, the light-emitting elements can be avoided from being influenced by heat generated in the formation of the piezoelectric elements. Therefore, a display apparatus with an SAW touch sensor which does not damage the elements formed on each of the surfaces of the transparent substrate can be obtained.

Furthermore, in the step of forming light-emitting elements, the step of forming an organic layer on the first electrode patterned in advance and forming a pattern for a second electrode on the organic layer is employed so that a touch panel integrated display apparatus using an organic EL element as a light-emitting element can be obtained. The transparent substrate is shared, and the light-emitting elements obtained by the organic EL elements and the piezoelectric elements having the SAW touch sensing function are formed on the surfaces of the transparent substrate to make it possible to contribute to a reduction in thickness of a display apparatus.

BRIEF DESCRIPTION OF THE DRAWINGS

FIG. 1 is a sectional view typically showing a display apparatus with SAW touch sensor;

FIG. 2 is a pattern diagram for explaining a function of the touch sensor formed on a glass substrate configuring the display apparatus shown in FIG. 1;

FIG. 3 is a signal waveform diagram for explaining a detecting operation at a touch position by the touch sensor shown in FIG. 2;

FIG. 4 is a flow sheet for explaining a first manufacturing process of the display apparatus with SAW touch sensor according to the invention;

FIG. 5A is a pattern diagram for explaining a stacking order of functional layers on the glass substrate executed along the flow sheet shown in FIG. 4;

FIG. 5B is a pattern diagram for explaining a stacking order of functional layers subsequent to FIG. 5A;

FIG. 5C is a pattern diagram for explaining a stacking order of functional layers subsequent to FIG. 5B;

FIG. 6 is a flow sheet for explaining a second manufacturing process of the display apparatus with SAW touch sensor according to the invention;

FIG. 7 is a pattern diagram for explaining a stacking order of parts in the manufacturing process shown in FIG. 6;

FIG. 8A is a pattern diagram for explaining a preferable film forming process performed in the step of forming light-emitting elements shown in FIGS. 4 and 6;

FIG. 8B is a pattern diagram for explaining a film forming process subsequent to FIG. 8A;

FIG. 9 is a pattern diagram for explaining a preferable first example in a case in which light-emitting elements and piezoelectric elements having a touch sensor function are connected to a flexible wiring substrate;

FIG. 10 is a pattern diagram for explaining a second example in the same case;

FIG. 11 is a pattern diagram for explaining a third example in the same case;

FIG. 12 is a front view showing another preferable configuration of an SAW touch sensor;

FIG. 13 is a circuit configuration diagram showing a configuration of a display panel and a drive circuit therefor;

FIG. 14 is a timing chart for explaining a preferable drive method of a touch sensor and a display apparatus;

FIG. 15 is a timing chart for explaining another preferable drive method of the touch sensor and the display apparatus; and FIG. 16 is a frequency spectrum for explaining a relationship between a frame frequency of the display apparatus and a detectable frequency band of the piezoelectric elements.

REFERENCE NUMERALS

1 Transparent substrate (glass substrate)
2 First electrode
3 Organic layer (organic EL element)
3a Organic hole transporting layer
3b Organic light-emitting layer
3c Organic electron transporting layer
4 Second electrode
5 Piezoelectric element
5A, 5B Drive-side transducers
5C, 5D Detection-side transducers
5a Underlying electrode
5b Piezoelectric thin film
5c Upper electrode
5d Protecting film
6 Sealing member
7 Adhesive agent
8a, 8b Vibration-absorbing members
11 Insulating layer
12 Cathode barrier

BEST MODE FOR CARRYING OUT THE INVENTION

A manufacturing process for a display apparatus with SAW touch sensor according to the invention will be described below. Prior to this description, a basic configuration of the display apparatus manufactured by using the invention will be described. FIG. 1 is a typical sectional view showing a display apparatus having a SAW touch sensor using an organic EL element as a light-emitting element.

Reference numeral 1 shown in FIG. 1 denotes a single transparent substrate (a glass substrate in this example), and a large number of organic EL elements serving as light-emitting elements are formed on a first surface (lower surface in FIG. 1) of the glass substrate 1 in the form of, for example, a matrix. The organic EL element basically includes a first electrode 2 formed on the glass substrate 1, an organic layer 3 formed on the first electrode, and a second electrode 4 formed on the organic layer.

The first electrode 2 is formed such that a transparent electrode made of, for example, an ITO is patterned on the first surface of the glass substrate 1 in the form of stripes. In the configuration shown in FIG. 1, the organic layer 3 includes an organic hole transporting layer 3a stacked on the first electrode 2, an organic light-emitting layer 3b stacked on the organic hole transporting layer, and an organic electron transporting layer 3c stacked on the organic light-emitting layer. On the organic electron transporting layer 3c, the second electrodes 4 are formed in a form of stripes to be orthogonal to an arranging direction of the first electrodes 2.

Therefore, the organic layers 3 are configured as organic EL elements at intersection points of the first and second electrodes 2 and 4 formed in the forms of stripes, respectively. Therefore, when a drive voltage is selectively applied between the first electrode 2 and the second electrode 4 to luminescently drive the organic EL elements formed at the intersection points of the electrodes. Light emitted in this manner is radiated through the first electrode 2 and the glass substrate 1 as shown in FIG. 1 and can be recognized as a display image.

On the other hand, on the second surface (upper surface in FIG. 1) of the glass substrate 1, piezoelectric elements 5 functioning an SAW touch sensor are formed. FIG. 2 typically shows the function of the SAW touch sensor in a state in which the glass substrate 1 is viewed from the upper surface. The piezoelectric elements 5 are respectively formed along the four sides of the glass substrate 1 formed in the shape of a rectangle to avoid a display surface at the center of the glass substrate 1 as shown in FIG. 2.

The piezoelectric elements 5 perform a function of a transducer which converts an electric signal into an SAW to transmit the SAW and a function of a transducer which receives the SAW to convert the SAW into an electric signal, respectively. Drive-side transducers 5A and 5B on two facing sides shown in FIG. 2 configures a drive side which converts an electric signal into an SAW to transmit the SAW, and operate to propagate the SAW on the surface of the glass substrate 1.

Detection-side transducers 5C and 5D on other two facing side receive the propagated SAWs and configure a detection side which receives the propagated SAW and converts the SAW into an electric signal. In this configuration, when an arbitrary portion of the surface of the glass substrate 1 is touched, the detection-side transducers 5C and 5D operate such that the propagation of the SAW is interrupted at the touch portion.

The configuration shown in FIG. 2 is designed to propagate the SAW as indicated by an arrow in a direction parallel to a diagonal of the glass substrate 1 to be especially suitable for miniaturization. As shown in FIG. 3, a SAW burst wave (drive signal) transmitted from the drive side has a waveform obtained by extending the waveform of an output signal in the direction of a time axis on the detection side.

When the SAW is interrupted when the upper surface of the glass substrate 1 is touched with a fingertip, a receiving signal at time depending on an interruption position is attenuated. For this reason, the touch position on the glass substrate 1 can be detected by time information of the attenuation portion.

FIG. 4 is a flow sheet for explaining a first manufacturing process of the display apparatus with SAW touch sensor having the above configuration. FIGS. 5A to 5C are to explain stacking orders of functional layers on the glass substrate 1 executed along the steps shown in FIG. 4. The steps indicated by reference symbols A to J in FIG. 4 correspond to steps of forming the functional layers typically shown as A to J in FIGS. 5A to 5C. The same functional layers shown in FIGS. 5A to 5C are denoted by the same reference numerals, respectively. However, in order to avoid cumbersome illustrations, description of the reference numerals are arbitrarily omitted.

In the first manufacturing process, the steps of forming the functional layers in a forming process of a display element shown on the left side in FIG. 4 and a forming process of an SAW touch device indicated by the right side in FIG. 4, i.e., the piezoelectric elements 5 are separately executed.

As shown in FIG. 4, a step of forming a first electrode is executed to the first surface of the glass substrate 1 first. This forming step includes a step of patterning transparent electrodes in the form of stripes. This manner is shown by (A) in FIG. 5A. Reference numeral 1 denotes the glass substrate 1, and reference numeral 2 denotes a transparent electrode (first electrode) formed on the first surface of the glass substrate 1.

In formation of the transparent electrode 2, sputtering of an ITO (Indium Tin Oxide), applying of a photoresist subsequent thereto, and patterning of the resist by exposure and development. By wet etching of the ITO film by, for example, a ferric chloride and a chlorine-based etchant, the transparent electrode is patterned in the form of stripes. Subsequently, a peeling step or the like of the remaining resist by an erosion method is performed to form the first electrode 2.

Subsequent to the forming step of the first electrode, a step of forming piezoelectric elements shown in FIG. 4 is executed. In the step of forming the piezoelectric elements as shown by (B) in FIG. 5A, film formation and patterning of an underlying electrode are executed to the second surface of the glass substrate 1. In this manner, as shown by a reference numeral 5a in FIG. 5A, underlying electrodes are formed along each of the sides of the second surface of the glass substrate 1.

The underlying electrodes 5a are made of, for example, an aluminum material and patterned in a comb-like shape at predetermined angles to each of the sides of the glass substrate 1. Even in the patterning, as in the step of forming the first electrode, a photolithography technique is preferably used.

Subsequently, as shown as (C) in FIGS. 4 and 5A, a piezoelectric thin film 5b made of, for example, zinc oxide (ZnO) or the like is formed to cover the underlying electrodes 5a. The piezo electric thin film 5b preferably uses a sputtering technique, and film formation can be desirably performed while heating the substrate.

Subsequently, as indicated by (D) in FIGS. 4 and 5A, an upper electrode 5c is formed at a position facing the underlying electrode 5a on the upper surface of the piezoelectric thin film 5b. The upper electrode 5c is made of an aluminum material and patterned in a comb-like shape at predetermined angles to each of the sides of the glass substrate 1. Even in this patterning, like the underlying electrode 5a, a photolithography technique is preferably used.

As shown by (E) in FIGS. 4 and 5B, the piezoelectric thin film 5b formed in advance is patterned. In this patterning, as shown by a broken line 5e in FIG. 5B, a process of removing other piezoelectric thin films by, for example, etching to leave a piezoelectric thin film 5b portion formed between the underlying electrode 5a and the upper electrode 5c.

At the end of the step of forming the piezoelectric elements, as shown by (F) in FIGS. 4 and 5B, a step of forming a protecting film 5d is executed. The protecting film 5d is formed to cover the piezoelectric thin film 5b left by the patterning of the piezoelectric thin film 5b and the upper electrode 5c patterned on the upper portion.

After the step of forming the piezoelectric elements, a step of forming light-emitting elements is executed. In this first manufacturing process, in the step of forming the light-emitting elements, as shown by (G) in FIGS. 4 and 5B, a step of forming an organic layer 3 on the first electrode (transparent electrode) 2 formed in advance is executed.

In (G) in FIG. 5B, one layer is shown as the organic layer 3. However, when, as the organic layer 3 as shown in, for example, FIG. 1, a three-layer structure including the organic hole transporting layer 3a, the organic light-emitting layer 3b, and the organic electron transporting layer 3c is used, a configuration obtained by inserting an electron or hole injected layer between appropriate layers of the three-layer structure may be employed. Even though the multi-layer structure as described above is employed as the organic layer 3, the organic EL materials configuring the layers sequentially form films by, for example, a resistance heating deposition method.

After the step of forming the organic layer 3, as shown by (H) in FIGS. 4 and 5B, a step of forming a second electrode is executed. As the second electrode 4 formed in this step, an aluminum material is preferably used, and this material is formed on the organic layer 3 by, for example, a resistance heating deposition method. In this case, when, for example, a mask is used in the deposition, the second electrodes 4 can be formed in the form of stripes. In this manner, at intersection positions between the first electrode 2 and the second electrode 4, a large number of organic EL element serving as light-emitting elements can be formed.

The organic layer 3, the second electrode 4, and the like including the laminated structures are oxidized by humidity (moisture) contained in the atmospheric air and disadvantageously deteriorated in light emitting characteristic. For this reason, a sealing step of sealing the organic layer 3, the second electrode 4, and the like with a sealing member is executed. More specifically, as shown by (I) in FIGS. 4 and 5C, a sealing member 6 which can cover the light-emitting elements including the organic layer 3, the second electrode 4, and the like is bonded to the glass substrate 1 through an adhesive agent 7, so that the light-emitting elements are sealed.

Subsequently, as shown by (J) in FIGS. 4 and 5C, a step of forming a vibration-absorbing member is executed. As the vibration-absorbing member, a first vibration-absorbing member as indicated by a reference numeral 8a is formed along the outside of the piezoelectric elements 5 formed on the second surface of the glass substrate 1, and a second vibration-absorbing member as shown by a reference numeral 8b is formed along a rear side through the glass substrate 1, i.e., a position facing the piezoelectric elements 5 on the first surface of the glass substrate 1.

The vibration-absorbing members 8a and 8b can cope with the following problem. More specifically, the SAW propagated from the piezoelectric elements toward an end portion of the glass substrate 1 is reflected by an end face of the glass substrate 1 to cause a problem in that the SAW propagated on the surface to be touched is adversely affected.

When the thickness of the glass substrate 1 is small, the piezoelectric elements 5 are easily influenced by mechanical vibration noise based on an electric signal for driving the light-emitting elements including the organic EL elements, and a problem in that erroneous detection is caused by the SAW touch sensor may be caused. Therefore, the vibration-absorbing members 8a and 8b are formed to suppress vibration of the substrate 1, and the SAW touch sensor can be effectively prevented from causing erroneous detection.

With the above steps, the display apparatus with SAW touch sensor can be obtained. However, according to the manufacturing process described above, the step of patterning the first electrode partially configuring the light-emitting elements on the first major surface of the single transparent substrate, and, thereafter, the step of forming the piezoelectric elements functioning as the SAW touch sensor on the second major surface of the transparent substrate is executed. For this reason, the piezoelectric elements can be prevented from being damaged by wet etching or the like executed in the step of patterning, especially, the first electrode.

Furthermore, according to the manufacturing process, after the piezoelectric elements are formed, the step of forming the light-emitting elements on the first electrode patterned on the first major surface in advance. For this reason, the organic layers configuring the light-emitting elements can be prevented from being damaged by heat given in formation of, especially, the piezoelectric thin films in the step of forming the piezoelectric elements.

FIG. 6 is a flow sheet for explaining a second manufacturing process of the display apparatus with SAW touch sensor. In the second manufacturing process, in comparison with the first manufacturing process shown in FIG. 4, a step of forming a vibration-absorbing member indicated by a reference symbol I and a sealing step indicated by a reference symbol J are replaced with each other in terms of time.

Pattern diagrams (I) and (J) shown in FIG. 7 show the above manner. More specifically, as the second manufacturing process, subsequent to the steps shown in the pattern diagrams (A) to (H) shown in FIGS. 5A and 5B, the steps shown in the pattern diagrams (I) and (J) shown in FIG. 7 are executed. In FIG. 7, the same reference numerals as in FIG. 5C described above denote parts corresponding to the parts shown in FIG. 5C.

In the step of forming the vibration-absorbing member in the second manufacturing process, as shown as (I) in FIG. 7, a first vibration-absorbing member 8a is formed along the outside of the piezoelectric elements 5 formed on the second surface of the glass substrate 1. Furthermore, the second vibration-absorbing member 8b is formed from the upper surface of the light-emitting elements formed on the first surface of the substrate 1 to cover the rear side of the glass substrate 1 at a position where the piezoelectric elements 5 are formed.

Subsequently, the sealing step is executed as (J) in FIG. 7. In the sealing step, the sealing member 6 which can cover the light-emitting elements and the second vibration-absorbing member 8b is bonded to the glass substrate 1 through the adhesive agent 7, so that the light-emitting elements are sealed.

Also by forming the vibration-absorbing members 8a and 8b having the configuration shown in FIG. 7, the SAW propagated from the piezoelectric elements toward the end portion of the glass substrate 1 is reflected by the end face of the glass substrate 1, so that the SAW propagated on the surface to be touched can be effectively suppressed from being adversely affected. In response to the influence of mechanical vibration noise based on the electric signal for driving the light-emitting elements, the SAW touch sensor can be effectively prevented from causing erroneous detection. Even in the second manufacturing process described with reference to FIGS. 6 and 7, the same functional effect as that in the first manufacturing process can be obtained.

FIGS. 8A and 8B are to explain preferable film forming processes performed in the steps of forming the light-emitting elements shown in FIGS. 4 and 6. More specifically, FIGS. 8A and 8B typically show steps indicated by reference symbols a1 and a2 surrounded by chain lines and subsequent reference symbols G and H in the steps of forming the light-emitting elements shown in FIGS. 4 and 6.

In the step of forming the light-emitting elements, as shown by (a1) in FIG. 8A, the insulating layers 11 are formed on the first electrode (transparent electrode) 2 formed in advance. The insulating layers 11 are similarly formed in the form of stripes in a direction orthogonal to the first electrode 2 patterned in the form of stripes. Even in the forming unit of the insulating layer 11, a photolithography technique is preferably used.

As the material configuring the insulating layer 11, for example, polyimide can be used. The polyimide is spin-coated on the glass substrate 1 on which the first electrode 2 is formed to have a predetermined film thickness and then pre-baked. Subsequently, a photoresist is applied to the polyimide and exposed and developed by using a mask having a light-transmitting slit to pattern the resist. The remaining resist is peeled to form the insulating layer 11 in the form of stripes.

Subsequently, as shown as (a2) in FIG. 8A, a cathode barrier 12 is formed on the insulating layer 11. In this case, in general, the first electrode 2 configures an anode, and the second electrode 4 configures a cathode. Since the cathode barrier 12 functions to electrically separate the second electrode serving as the cathode, the barrier 12 is referred to as a cathode barrier.

In order to form the cathode barrier 12, a lift-off negative photoresist purposely having a low UV transmittance is spin-coated and pre-baked. UV light is irradiated on the photoresist through, for example, a hard chromium mask having a light-transmitting slit to expose the photoresist. At this time, since the photoresist has a low UV transmittance, resolvabilities to a developing solution varies in a direction of depth.

Therefore, an alkaline developing solution is sprayed and showered onto the substrate, the cathode barrier 12 having an inverted isosceles trapezoid is formed to project from the upper surface of the insulating layer 11 due to differences between progressivenesses of development.

In this manner, the sectional shapes of the cathode barriers 12 in a direction orthogonal to the longitudinal direction of the cathode barrier 12 are almost inverted isosceles trapezoids. For this reason, in film formation for the second electrode 4 (will be described later), adjacent cathode lines are divided by the cathode barrier 12 to make it possible to secure sufficient electric insulation.

Subsequent, after the cathode barrier 12 is formed, as shown as (G) in FIG. 8A, the step of forming the organic layer 3 is executed. Also in this diagram, one layer is shown as the organic layer 3. However, as described above, the organic layer 3 may have a three-layer structure or a multi-layer structure including three or more layers as shown in, for example, FIG. 1. These layers are sequentially formed by, a resistance heating deposition method. In this case, the organic layer 3 is formed between the barriers 12 and also formed on the upper portions of the barriers 12.

Furthermore, as shown as (H) in FIG. 8B, an aluminum alloy layer indicated by a reference numeral 4 is formed by, a resistance heating deposition method. The aluminum alloy layer 4 configures the second electrode. The aluminum alloy layer 4 is formed on the organic layer 3 formed between the cathode barriers 12 and also formed on the organic layer 3 formed on the upper portions of the barriers 12. However, the organic layer 3 formed on the upper portion of the cathode barrier 12 does not contribute to a light-emitting function of the display apparatus.

By the formation of the aluminum alloy layer 4, second electrodes (also indicated by the same reference numeral 4) are formed in regions sandwiched by the cathode barriers 12 such that the second electrodes are isolated from each other by the cathode barriers 12 to server as cathode lines separated in the form of stripes. The organic layer 3 is arranged in the form of a matrix on the intersection positions between the first electrodes (anode lines) 2 and the second electrodes (cathode lines) 4.

After the step of forming the second electrodes 4 as shown as (H) in FIG. 8B, the sealing step and the step of forming a vibration-absorbing member shown by (I) and (J) in FIG. 5C are sequentially executed. After the step of forming the second electrodes 4 shown as (H) in FIG. 8B, the step of forming a vibration-absorbing member and the sealing step shown by (I) and (J) in FIG. 7 may be sequentially executed.

A preferable configuration of the display apparatus with SAW touch sensor manufactured by the manufacturing process described above will be described below. FIGS. 9 to 11 are to explain a preferable example obtained when, in a configuration which has light-emitting elements formed on a first surface of the glass substrate serving as a single transparent substrate and piezoelectric elements functioning as an SAW touch sensor and formed on a second surface of the glass substrate, an glass substrate 1 (this is called a first extraction wire) connected to the light-emitting elements and an extraction wire 22 (this is called a second extraction wire) connected to the piezoelectric elements are connected to a flexible wiring substrate.

In examples shown in FIGS. 9 to 11, the light-emitting elements, the piezoelectric elements, and the like formed on each of the surfaces of the glass substrate 1 will be omitted to avoid illustrative complication.

FIG. 9 shows the first preferable embodiment. FIG. 9(A) shows a transparent substrate (glass substrate 1) on which the light-emitting elements are formed when viewed from the first surface, and FIG. 9(B) is an enlarged sectional view of the transparent substrate when viewed from a section line indicated by a chain line in FIG. 9(A) in an arrow A1-A1 direction.

In the configuration shown in FIG. 9, a conductive through hole 23 which electrically connects the first surface and the second surface of the transparent substrate (glass substrate 1) to each other is provided. The first extraction wire 21 or the second extraction wire 22 is extracted to the same surface of the transparent substrate through the conductive through hole 23, connected to the flexible wiring substrate on the same surface, and extracted to the outside of the transparent substrate.

More specifically, in the embodiment shown in FIG. 9, a first flexible wiring substrate 25 electrically connected to the large number of first extraction wires 21 connected to the light-emitting elements and a second flexible wiring substrate 26 electrically connected to the second extraction wires 22 connected to the piezoelectric elements are arranged on the first surface of the glass substrate 1 on which the light-emitting elements are formed.

The large number of the first extraction wires 21 from the light-emitting elements are extracted to the outside of the glass substrate 1 through the first flexible wiring substrate 25 and connected to a light-emission control circuit on which a CPU (not shown) and the like are mounted. The second extraction wires 22 connected to the piezoelectric elements are connected to the through hole 23 formed on the glass substrate 1.

The second extraction wires 22 are guided to the first surface of the glass substrate 1, i.e., the surface on which the light-emitting elements are formed through conductive through hole 23, connected to the second flexible wiring substrate 26, and connected to an SAW touch sensor control circuit (not shown) through the second flexible wiring substrate 26.

According to a the connection configuration to the flexible wiring substrate, the first and second flexible wiring substrates 25 and 26 can be arranged on the first surface of the glass substrate 1 on which the light-emitting elements are formed so as to make it possible to contribute to simplification of the connection to the control circuits.

FIG. 10 shows a second preferable embodiment obtained when the first and second extraction wires are connected to the flexible wiring substrate. FIG. 10(A) shows the transparent substrate (glass substrate 1) on which the light-emitting elements are formed when viewed from the first surface, and FIG. 10(B) is an enlarged sectional view of the transparent substrate when viewed from a section line indicated by a chain line in FIG. 10(A) in an arrow A2-A2 direction. In FIG. 10, the same reference numerals as in FIG. 9 described above denote parts corresponding to the parts shown in FIG. 9.

The configuration shown in FIG. 10 is characterized in that the first and second extraction wires 21 and 22 are connected to the first and second flexible wiring substrates 25 and 26, respectively, and extracted from the same side of the transparent substrate (glass substrate 1) to the outside of the transparent substrate.

More specifically, in the embodiment shown in FIG. 10, the first flexible wiring substrate 25 electrically connected to the large number of first extraction wires 21 connected to the light-emitting elements and the second flexible wiring substrate 26 electrically connected to the extraction wires 22 connected to the piezoelectric elements are arranged on the first surface of the glass substrate 1 on which the light-emitting elements are formed.

The second extraction wires 22 connected to the piezoelectric elements are also connected to the conductive through hole 23 formed in the glass substrate 1, guided to the first surface of the glass substrate 1, i.e., the surface on which the light-emitting elements are formed through the conductive through hole 23, and connected to the second flexible wiring substrate 26.

The first and second flexible wiring substrates 25 and 26, as shown in FIG. 10(A), on the first surface of the glass substrate 1, are arranged on the same side of the rectangular substrate 1 and extracted to the outside of the glass substrate 1 through the flexible wiring substrates 25 and 26, respectively. Therefore, according to the configuration, the extraction wires 21 and 22 from the light-emitting elements and the piezoelectric elements can be extracted from one side of the glass substrate 1 through the wiring substrates 25 and 26, respectively, so as to make it possible to contribute to simplification of the connection to the control circuits.

FIG. 11 shows a third preferable embodiment obtained when the first and second extraction wires are connected to the flexible wiring substrate. FIG. 11(A) shows the transparent substrate (glass substrate 1) on which the light-emitting elements are formed when viewed from the first surface, and FIG. 11(B) is an enlarged sectional view of the transparent substrate when viewed from a section line indicated by a chain line in FIG. 11(A) in an arrow A3-A3 direction. Even in FIG. 11, the same reference numerals as in FIG. 9 described above denote parts corresponding to the parts shown in FIG. 9.

The configuration shown in FIG. 11 is characterized in that the first and second extraction wires 21 and 22 are connected to the same flexible wiring substrate and extracted from the same side of the transparent substrate (glass substrate 1) to the outside of the transparent substrate.

More specifically, in the embodiment shown in FIG. 11, the flexible wiring substrate electrically connected to the large number of first extraction wires 21 connected to the light-emitting elements and the flexible wiring substrate electrically connected to the second extraction wires 22 connected to the piezoelectric elements are configured by the common flexible wiring substrate 25. The flexible wiring substrate 25 is arranged along one side of the first surface of the glass substrate 1.

Even in the configuration shown in FIG. 11, the second extraction wires 22 connected to the piezoelectric elements are connected to the conductive through hole 23 formed on the glass substrate 1, guided to the first surface of the glass substrate 1, i.e., the surface on which the light-emitting elements are formed through the conductive through hole 23, and connected to the common flexible wiring substrate 25.

Therefore, according to the configuration, the extraction wires from the light-emitting elements and the piezoelectric elements can be electrically extracted from one side of the glass substrate 1 through the common flexible wiring substrate so as to make it possible to contribute to simplification of the connection to the control circuits.

FIG. 12 shows another preferable embodiment of the SAW touch sensor configured by the piezoelectric elements. In an example shown in FIG. 12, in a configuration which has light-emitting elements formed on the first surface of the glass substrate 1 serving as a single transparent substrate and piezoelectric elements functioning the SAW touch sensor arranged on the second surface of the glass substrate, a plurality of touch detection regions functioning touch sensors are arranged on the second surface of the substrate.

More specifically, in the example shown in FIG. 12, a display region on the glass substrate 1 are equally divided into four regions in vertical and horizontal directions and designed to independently function as touch detection regions. As in the example described on the basis of FIG. 2, as shown by reference numerals 5A to 5D in the upper left touch detection region, each of the touch detection regions includes a combination of drive-side transducers 5A and 5B which convert electric signals into SAWs to transmit the SAWs and detection-side transducers 5C and 5D which receive the propagated SAWs and convert the SAWs into electric signals.

According to the configuration, in each of the touch detection regions partitioned into four regions in the horizontal and vertical directions of the substrate 1, a touch position can be independently detected. For this reason, in the touch detection regions, touched states can be simultaneously detected. Therefore, according to the configuration, a more complex command (command made by a simultaneous touch) can be input.

FIGS. 13 to 15 are to explain a touch sensor preferably employed in the display apparatus with SAW touch sensor and a method of driving the display apparatus. In the explanation of the drive method, an example of a circuit configuration which drives the display apparatus will be described below.

FIG. 13 shows a passive matrix display panel and a configuration of a drive circuit of the passive matrix display panel. This shows a conformation of cathode line scanning/anode line drive. More specifically, m data lines (to be also referred to as anode lines hereinafter) A1 to Am are arranged in a vertical direction, n scanning lines (to be also referred to as cathode lines hereinafter) K1 to Kn are arranged in a horizontal direction, and organic EL elements E11 to Emn serving as light-emitting elements indicated by symbol marks of diodes are arranged at intersection positions (a total of m×n positions) to configure a display panel 31.

One ends (anode terminals in equivalent diodes of EL elements) of the organic EL elements E11 to Emn configuring pixels are connected to the anode lines depending on the intersection positions between the anode lines A1 to Am along the vertical direction and the cathode lines K1 to Kn along the horizontal direction, respectively, and the other ends (cathode terminals in the equivalent diodes of the EL elements) are connected to the cathode lines, respectively. Furthermore, the anode lines A1 to Am are connected to an anode line drive circuit 32 serving as a data driver, and the cathode lines K1 to Kn are connected to a cathode line scanning circuit 33 serving as a scanning driver to drive the organic EL elements E11 to Emn.

The anode line drive circuit 32 includes the constant current sources I1 to Im and drive switches Sa1 to Sam serving as luminescently drive power supplies operated by using a drive voltage from a drive voltage source VH. The drive switches Sa1 to Sam are connected to the constant current sources I1 to Im to supply currents from the constant current sources I1 to Im to the organic EL elements E11 to Emn arranged in accordance with the cathode lines to be scanned, respectively, as luminescent drive currents.

The drive switches Sa1 to Sam are configured such that a ground (GND) potential serving as a reference potential of a circuit serving as a non-luminescent drive power supply can be supplied to the organic EL elements E11 to Emn arranged in accordance with the cathode lines, respectively.

On the other hand, the cathode line scanning circuit 33 includes scanning switches SK1 to Skn in accordance with the cathode lines K1 to Kn, and is configured such that at least one of a reverse bias voltage from a reverse bias voltage source VM used to mainly prevent crosstalk light emission functioning as a non-scanning selection potential or a ground (GND) potential serving as a scanning selection potential can be supplied to corresponding cathode lines.

Control signals are supplied to the anode line drive circuit 32 and the cathode line scanning circuit 33 through a control bus by a light-emitting control circuit 34 including a CPU or the like, respectively. On the basis of a video signal to be displayed, switching operations of the scanning switches SK1 to Skn and the drive switches Sa1 to Sam are executed.

In this manner, an operation of connecting the constant current sources I1 to Im to desired anode lines is repeated while sequentially setting the cathode lines (scanning lines) in a predetermined cycle on the basis of a video signal, and an image based on the video signal is displayed on the display panel 31 as if the organic EL elements E11 to Emn continuously emit light.

According to the drive apparatus for the display panel, since the EL elements are current drive elements, noise is generated, for example, at a rising timing and a falling timing of scanning of the scanning lines. The noise disturbs the SAW touch sensor to disadvantageously cause erroneous detection.

Therefore, as a countermeasure to be able to prevent erroneous detection of the touch sensor, the touch sensor and the drive method of the display apparatus shown in FIGS. 14 and 15 are preferably employed.

The drive method shown in FIGS. 14 and 15 is characterized in that a display apparatus with SAW touch sensor in which a plurality of scanning lines and a plurality of date lines and light-emitting elements arranged at intersection positions between the scanning lines and the data lines are arranged on the first surface of the glass substrate serving as a single transparent substrate and piezoelectric elements and an SAW touch sensor including a touch region surrounded by the piezoelectric elements are arranged on the second surface of the glass substrate, includes a plurality of scanning periods in which scanning is performed in units of scanning lines in one frame period and a touch detection period in which contact to the touch region is detected, and the touch detection period is set as a period except for a rise timing and a fall timing.

The drive method shown in FIG. 14 (will be described below) is characterized in that the touch detection period is set as a period different from the plurality of the scanning periods. The drive method shown in FIG. 15 (will be described below) is characterized in that the touch detection period is set in synchronization with the scanning periods, respectively.

The drive method shown in FIG. 14 is controlled to separately perform drive in a scanning period and a touch detection period obtained by dividing one frame period. In this example shown in FIG. 14, a scanning period is set as a period accounting for a large share of one frame period from the beginning of the period. Thereafter, the remaining period is set as the touch detection period. In the scanning period, the n scanning lines are sequentially set as a scanning selection line to execute scanning of one frame.

The subsequent touch detection period is set such that a touch detection operation is executed after the end of scanning of the nth scanning line. This touch detection operation is set to be ended before scanning of the first scanning line in the next frame is started.

According to the drive operation shown in FIG. 14, the drive operations are separately performed in the scanning period in which the first to nth scanning lines are continuously scanned and the touch detection period by the SAW touch sensor, the scanning period and the touch detection period being obtained by dividing one frame period. For this reason, a problem in that noise generated by the scanning with luminescent drive of the display apparatus disturbs the touch sensor circuit to cause erroneous detection can be solved.

In a drive method shown in FIG. 15, the first to nth scanning lines are continuously scanned in one frame period, and an operation is performed such that touch detection periods by the SAW touch sensors are set in a period between a rising timing and a falling timing of scanning in each of the scanning lines. More specifically, each of the touch detection periods is set in synchronism with each of the scanning periods of the first to the nth scanning lines and set not to overlap the rising timing and the falling timing of scanning in each of the scanning lines.

According to the drive operation shown in FIG. 15, in the period between the rising timing and the falling timing of scanning in each of the scanning lines, an operation is performed to execute touch detection by each touch sensor. For this reason, especially, a problem in that noise generated at the rising timing and the falling timing of scanning disturbs the touch sensor circuit to cause erroneous detection can be solved.

FIG. 16 is also to explain another preferable operation which prevent a touch detection operation by the SAW touch sensor from causing erroneous detection by noise generated by a display drive operation.

A drive method shown in FIG. 16 is characterized in that, in a display apparatus in which light-emitting elements are arranged on a first major surface of a single transparent substrate and piezoelectric elements functioning as a SAW touch sensor is arranged on a second major SURFACE E, a frame frequency when the light-emitting elements are luminescently driven is set to be different from a detectable frequency band of the piezoelectric elements. In addition, the detectable frequency band of the piezoelectric elements is desirably set to be different from a frequency which is N (N is a positive integer) times the frame frequency.

FIG. 16 is to explain an example of the preferable relationship. A frame frequency Fd used when the light-emitting elements are luminescently driven is preferably set to 50 to 150 Hz. A clock frequency of the drive circuit which luminescently drives the light-emitting elements preferably falls within the range of 30 K to 30 MHz. A drive signal frequency Fp of the touch sensor is set to 10 to 40 MHz. In this case, the frequency Fp is tuned such that a detectable frequency band Fw of the piezoelectric elements 5 is out of the drive frequency Fp.

Therefore, when the relationship between the frequencies described in the example is set, the detectable frequency band Fw of the piezoelectric elements 5 can be set to be different from a frequency which is N times the frame frequency Fd. In this manner, the touch detection operation by the SAW touch sensor can be effectively prevented from causing erroneous detection by noise generated on the basis of a display drive operation.

The invention claimed is:

1. A method of manufacturing a display apparatus with an SAW touch sensor in which light-emitting elements are formed on a first major surface of a single transparent substrate and piezoelectric elements functioning as an SAW touch sensor are formed on a second major surface of the transparent substrate, said method comprising:

a step of forming a first electrode of the light-emitting elements with forming a first electrode pattern of the light-emitting elements on the first major surface of the transparent substrate;

a piezoelectric elements forming step of forming the piezoelectric elements on the second major surface after the step of forming the first electrode of the light-emitting elements; and a light-emitting elements forming step of forming the light-emitting elements on the first major surface on which the first electrode is patterned after the piezoelectric elements forming step are sequentially executed to obtain the display apparatus with the SAW touch sensor.

2. The manufacturing method according to claim 1, wherein as the light-emitting elements forming step, an organic layer forming step of forming an organic layer on the first major surface on which the first electrode is patterned; and a second electrode forming step of forming a second electrode pattern on the organic layer after the organic layer forming step are executed to form the light-emitting elements.

* * * * *